United States Patent [19]

Uchikoshi et al.

[11] Patent Number: 5,614,753
[45] Date of Patent: Mar. 25, 1997

[54] SEMICONDUCTOR DEVICE WITH LEAKAGE CURRENT PREVENTION

[75] Inventors: Susumu Uchikoshi; Shigeyuki Kiyota, both of Yokohama; Yasukazu Iwasaki; Takatoshi Noguchi, both of Yokosuka; Makoto Uchiyama, Miura, all of Japan

[73] Assignee: Nissan Motor Co., Ltd., Yokohama, Japan

[21] Appl. No.: 575,904

[22] Filed: Dec. 20, 1995

[30] Foreign Application Priority Data

Dec. 22, 1994 [JP] Japan ................................. 6-319809

[51] Int. Cl.$^6$ .................................................. H01L 29/82
[52] U.S. Cl. .................... 257/417; 257/419; 257/496; 257/529; 257/619; 257/622; 437/901
[58] Field of Search ....................... 257/496, 417, 257/419, 529, 622, 619, 418; 437/901, 74, 75, 228

[56] References Cited

U.S. PATENT DOCUMENTS 5,356,829 10/1994 Willman .......................... 257/419 X
5,525,549 6/1996 Fukada et al. ..................... 437/901 X

FOREIGN PATENT DOCUMENTS 63-122279 5/1988 Japan ..................................... 437/901
2224374 9/1990 Japan ..................................... 437/901

*Primary Examiner*—William Mintel
*Attorney, Agent, or Firm*—Foley & Lardner

[57] ABSTRACT

A semiconductor device is produced through electrolytic etching process. The device comprises a P-type silicon substrate. An N-type epitaxial layer is formed on the silicon substrate. P-type regions are defined in the N-type epitaxial layer. N-type regions are defined in some of the P-type regions. A first wiring layer connects to predetermined ones of the P-type regions. A second wiring layer connects to predetermined ones of the N-type regions. The semiconductor device has a given part which has such a possibility that a predetermined magnitude of leakage current flows therethrough between the first and second wiring layers when subjected to the electrolytic etching process. The semiconductor device further has a circuit which is electrically connected to one of the first and second wiring layers. The circuit is capable of removing the possibility of the leakage current flow through the given part when opened.

8 Claims, 4 Drawing Sheets

SEMICONDUCTOR DEVICE WITH LEAKAGE CURRENT PREVENTION

BACKGROUND OF THE INVENTION

1. Field of the invention

The present invention relates in general to a semiconductor device such as semiconductor pressure sensor, semiconductor acceleration sensor or the like and a method of producing same. More specifically, the present invention is concerned with the semiconductor devices of a type and a method of producing same, which type comprises a silicon substrate, two mutually isolated electric parts arranged on the substrate, wiring or electrodes electrically connecting to or electrically connectable to the two electric parts, and means for connecting the wiring or the electrodes to an external electric device to keep the two electric parts at given potentials.

2. Description of the Prior Art

For producing a semiconductor device, there has been widely used a so-called "electrolytic etching method", which will be described in the following with reference to FIG. 7 which shows a semiconductor device SD-0.

In the drawing, denoted by numeral 1 is a P-type silicon substrate, and 3 is an N-type epitaxial layer formed on the silicon substrate 1. High density N-type diffused layers 4 are formed at given positions of the epitaxial layer 3. The diffused layers 4 are electrically connected through wiring layers 7. Denoted by numeral 5 is a high density P-type region (viz., isolating region) which is arranged to divide the epitaxial layer 3 into mutually isolated islands. Designated by numeral 6 is a wiring layer through which the potential of the silicon substrate 1 can be controlled. Designated by numerals 2a and 2b are oxide films covering the semiconductor device SD-0.

In order to produce the semiconductor device SD-0 from a silicon substrate, an electrolytic etching is carried out. For this etching, a solo called "stop etching method" is usually used, which uses the etching characteristic appearing in an interface between the P-layer and the N-layer. That is, in the method, etching of the silicon substrate is carried out in an alkaline etching liquid while applying, through the high density diffused layers 4, the epitaxial layer 3 with a positive voltage having a reference electrode immersed in the liquid. With this, suitable recesses are provided in the silicon substrate.

However, the above-mentioned method has the following drawback. That is, if, due to failure in photo-printing, the silicon substrate has a part through which a P-type region and an N-type region are electrically connected, a certain leakage current is forced to flow from the N-type region to the P-type region at the time of electrolytic etching. This causes a certain potential drop of the epitaxial layer 3, resulting in that the etching fails to stop at the interface defined between the P-layer and the N-layer. Of course, in this case, desired recesses are not provided in the semiconductor device SD-0.

One method for solving the above-mentioned drawback is shown in Japanese Patent First Provisional Publication 3-209778. In this method, the leakage current is detected by applying a junction (viz., PN-junction) of the P-layer and the N-layer with a reverse voltage, and the electrolytic etching is actually made to the silicon substrate only when the detected leakage current is smaller than a predetermined value.

However, due to its nature, the method of the publication fails to obtain a desired yield of products. That is, in this method, when the detected leakage current is greater than the predetermined value, etching is not made to the silicon substrate. In fact, this silicon substrate can not be used any longer, resulting in a poor yield of the products.

SUMMARY OF THE INVENTION

It is therefore an object of the present invention to provide a semiconductor device which is free of the above-mentioned drawbacks.

According to the present invention, there is provided a semiconductor device which is equipped with a circuit which removes a possibility of leakage current flow in a given part of the device when opened.

According to a first aspect of the present invention, there is provided a semiconductor device produced through electrolytic etching process, which device comprises a P-type silicon substrate; an N-type epitaxial layer formed on the silicon substrate; first means defining in the N-type epitaxial layer P-type regions; second means defining in some of the P-type regions N-type regions; a first wiring layer connecting to predetermined ones of the P-type regions; a second wiring layer connecting to predetermined ones of the N-type regions; a given part which has such a possibility that a predetermined magnitude of leakage current flows therethrough between the first and second wiring layers when subjected to the electrolytic etching process; and a circuit electrically connected to one of the first and second wiring layers, the circuit being capable of removing the possibility of the leakage current flow through the given part when opened.

According to a second aspect of the present invention, there is provided a method of producing a semiconductor device, which comprises the steps of (a) preparing a subassembly which comprises a P-type silicon substrate; an N-type epitaxial layer formed on the silicon substrate; first means defining in the N-type epitaxial layer P-type regions; second means defining in some of the P-type regions N-type regions; a first wiring layer connecting to predetermined ones of the P-type regions; a second wiring layer connected to predetermined ones of the N-type regions; a given part which has such a possibility that a predetermined magnitude of leakage current flows therethrough between the first and second wiring layers when subjected to an electrolytic etching process; and a circuit electrically connected to one of the first and second wiring layers, the circuit being capable of removing the possibility of the leakage current flow through the given part when opened, (b) inspecting the subassembly by using a microscope to check out whether not the given part is covered with an electrically conductive substance; (c) opening the circuit when the inspection finds that the given part is covered with such conductive substance; and (d) subjecting the subassembly to the electrolytic etching process.

According to a third aspect of the present invention, there is provided a method of producing a semiconductor device, which comprises the steps of (a) preparing a subassembly which comprises a P-type silicon substrate; an N-type epitaxial layer formed on the silicon substrate; first means defining in the N-type epitaxial layer P-type regions; second means defining in some of the P-type regions N-type regions; a first wiring layer connecting to predetermined ones of the P-type regions; a second wiring layer connecting to predetermined ones of the N-type regions; a given part which has such a possibility that a predetermined magnitude of leakage current flows therethrough between the first and second wiring layers when subjected to an electrolytic etching process; and a circuit electrically connected to one of the first and second wiring layers, the circuit being capable of removing the possibility of the leakage current flow through the given part when opened, (b) measuring a leakage current flow in the given part by applying between the first and second wiring layers a reversed voltage; (c) opening the circuit when the measured leakage current flow exceeds a predetermined magnitude; and (d) subjecting the subassembly to the electrolytic etching process.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
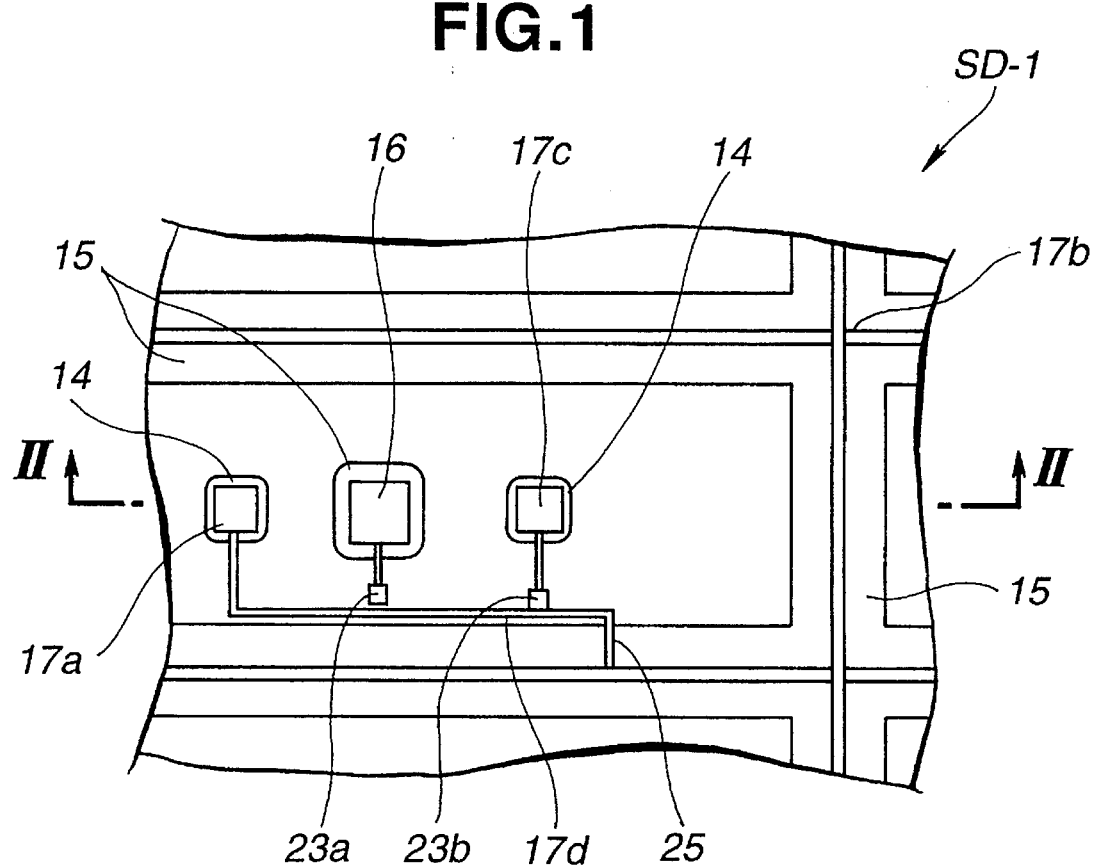
FIG. 1 is a plan view of an essential portion of a semiconductor device, which is a first embodiment of the present invention.
Figure 2:
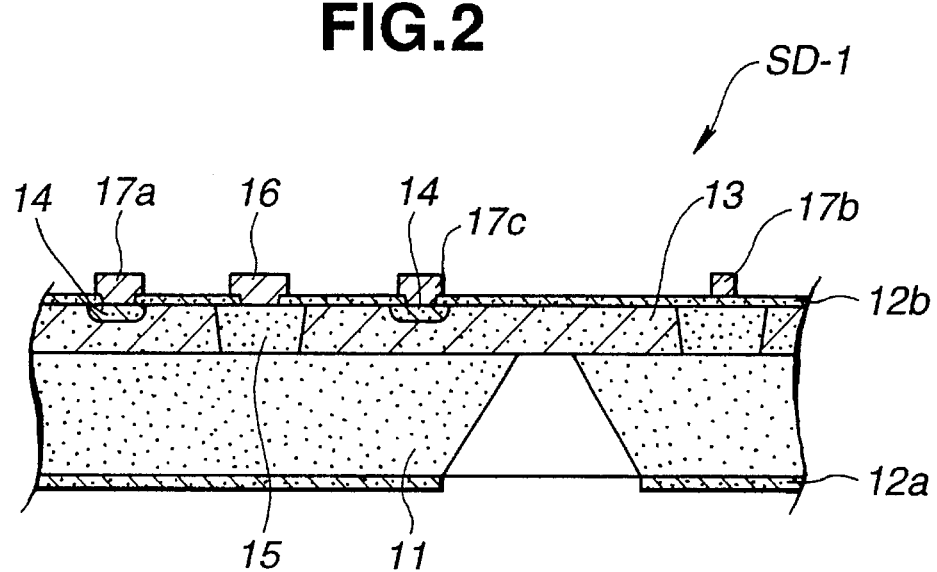
FIG. 2 is a sectional view taken along the line II—II of FIG. 1.
Figure 3:
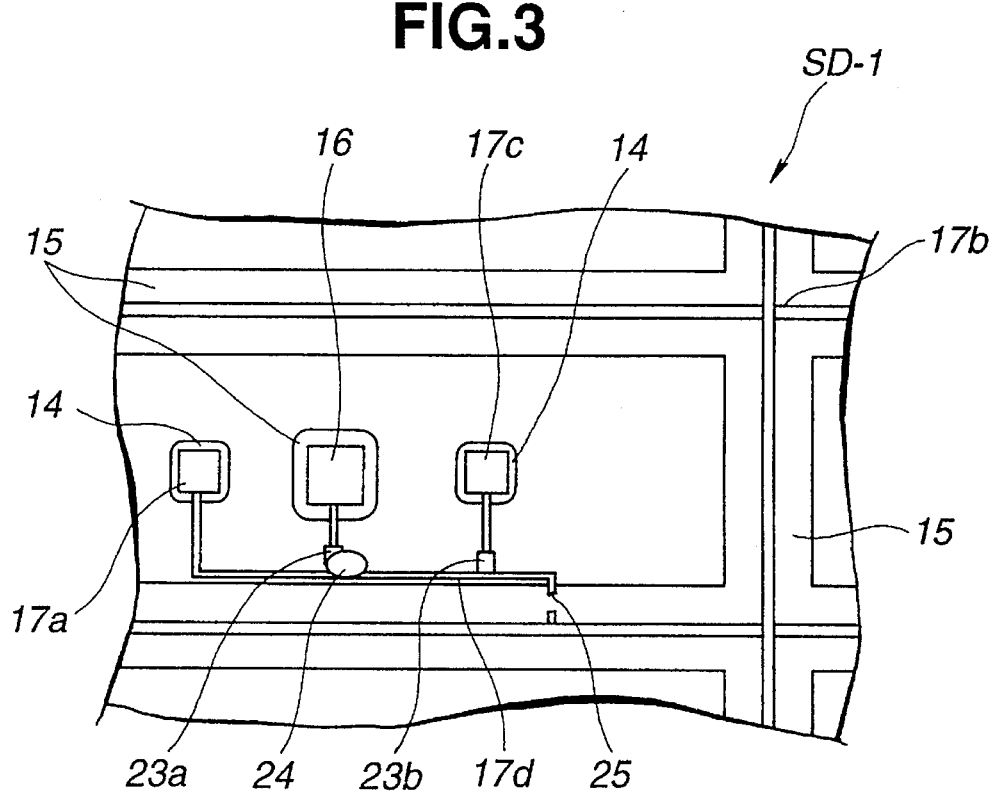
FIG. 3 is an illustration used for explaining the measure for suppressing current leakage which would occur in the semiconductor device of the first embodiment.

Referring to FIGS. 1 to 3, there is shown a semiconductor device SD-1 which is a first embodiment of the present invention.

In the drawings, denoted by numeral 11 is a P-type silicon substrate, and 13 is an N-type epitaxial layer formed on the silicon substrate 11. High density N-type diffused layers 14 are formed at given positions of the epitaxial layer 13. These diffused layers 14 are electrically connected through wiring layers 17a, 17c and 17d. The wiring layer 17b stretches over the silicon substrate 11. Denoted by numerals 15 are high density P-type regions (viz., isolating regions) which are arranged to divide the epitaxial layer 13 into mutually isolated islands (viz., N-type epitaxial regions). Designated by numeral 16 is a wiring layer through which the potential of the silicon substrate 11 can be controlled. Designated by numerals 12a and 12b are oxide films which cover the semiconductor device SD-1.

Designated by numeral 23a is a terminal pad for the P-type region and 23b is a terminal pad for N-type region. Although not shown in the drawings, fine lead wires extending from an external element are welded to the pads 23a and 23b.

Designated by numeral 25 (see FIGS. 1 and 3) is a wiring layer which electrically connects the mutually isolated islands (viz., N-type epitaxial regions) with the widely stretching wiring layer 17b.

In order to produce the semiconductor device SD-1 having the above-mentioned structure, the above-mentioned "stop etching method" can be used.

For the reasons which will be described hereinafter, in the present invention, the stop etching method can be employed. That is, for the production, etching of the silicon substrate is carried out in an alkaline etching liquid while applying, through the high density diffused layers 14, the epitaxial layer 13 with a positive voltage having a reference electrode immersed in the liquid.

In the present invention, a circuit pattern which has been formed on the silicon substrate is inspected with a microscope before carrying out the electrolytic etching.

That is, as is seen from FIG. 3, if, upon microscopic inspection, it is found that a foreign conductive substance 24 such as a silicon fragment or the like is placed on the device SD-1 at such a position as to electrically connect the P-type region terminal pad 23a with the wiring layer 17d of the N-type epitaxial region, the wiring layer 25 is cut out for breaking the electric connection between the wiring layer 17b and the wiring layer 17d. Cutting of the wiring layer 25 is easily made by using a tool having a pointed head. If the wiring layer 25 is not cut out even in such a case, the foreign substance 24 would constitute a current leakage region through which undesired leakage current flows under the electrolytic etching process.

Due to the cutting of the wiring layer 25, the region of the foreign substance 24 is suppressed from flowing the leakage current therethrough even when the wiring layer 17b is applied with a certain voltage. Accordingly, leakage of current appearing in the silicon substrate upon the electrolytic etching can be minimized, so that the epitaxial layer 13 can be kept at a desired sufficient potential. Thus, the stop etching method is properly carried out.

Figure 4:
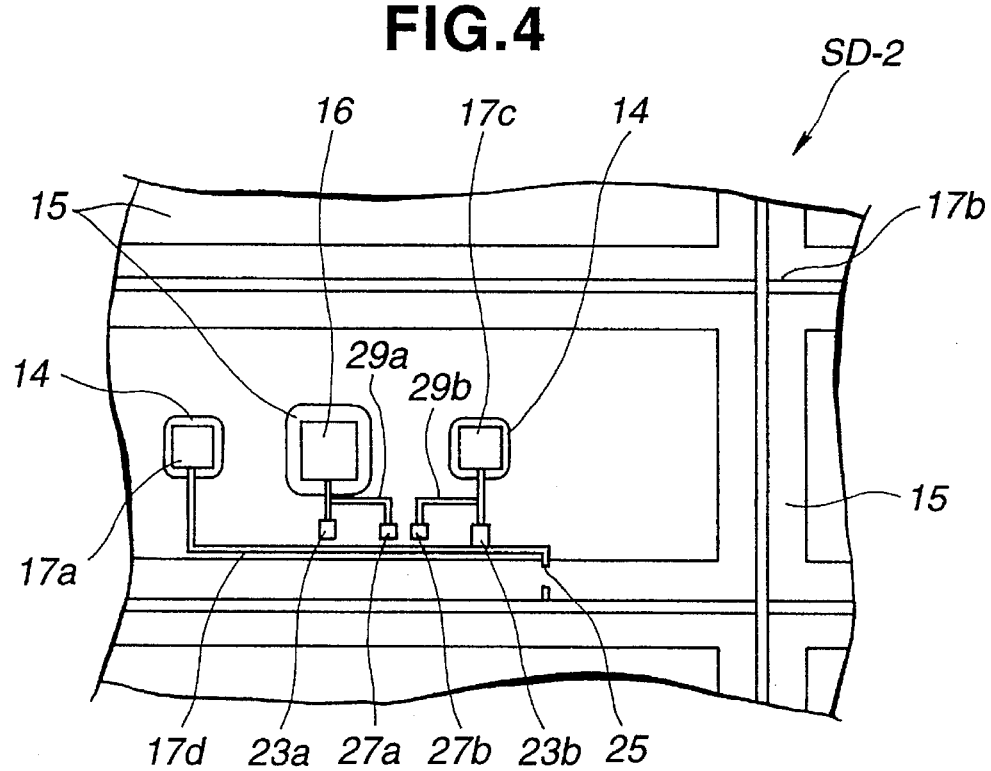
FIG. 4 is a view similar to FIG. 1, but showing a second embodiment of the present invention.

Referring to FIG. 4, there is shown a semiconductor device SD-2 which is a second embodiment of the present invention.

Since the semiconductor device SD-2 of the second embodiment is similar in construction to that of the first embodiment SD-1, only parts and construction different from those of the first embodiment will be described in the following.

As is shown in FIG. 4, in the second embodiment, additional terminal pads 27a and 27b are provided, which are connected to the P-type and N-type regions through respective wiring layers 29a and 29b. These additional pads 27a and 27b are used for measuring the leakage current which would appear upon the electrolytic etching.

By measuring the leakage current before the electrolytic etching process, an area wherein the leakage is actually taking place can be found. That is, for this purpose, a pair of terminal pads are provided for each epitaxial area, and for the leakage current measurement, a reversed voltage is applied between the P-type and N-type regions.

Figure 5:
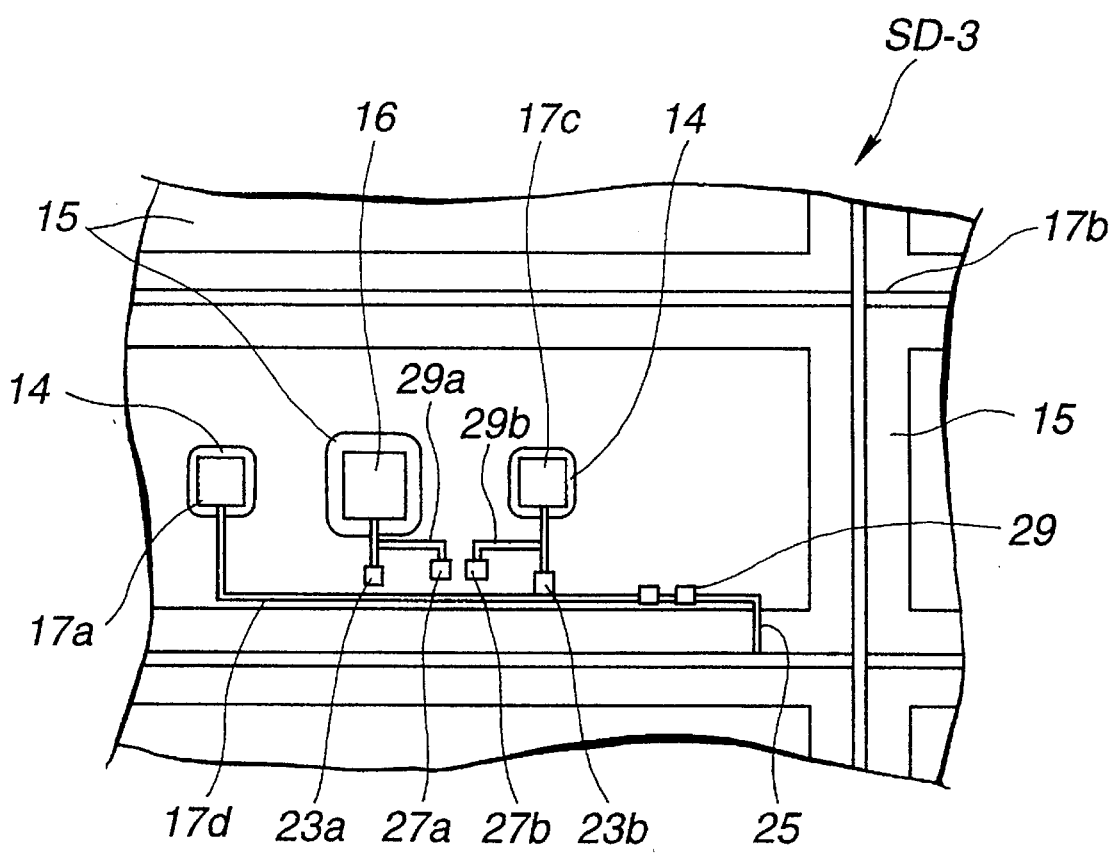
FIG. 5 is a view similar to FIG. 1, but showing a third embodiment of the present invention.

Referring to FIG. 5, there is shown a semiconductor device SD-3 which is a third embodiment of the present invention.

Since the semiconductor device SD-3 of the third embodiment is similar in construction to that of the second embodiment SD-2, only parts and construction different from those of the second embodiment will be described in the following.

As is shown in FIG. 5, in the third embodiment, a fuse 29 is operatively arranged in the wiring layer 25. Preferably, the fuse 29 is 1 μm in thickness and 5 μm in width.

In this embodiment, cutting of the wiring layer 25 is easily achieved by flowing an excessive current through the wiring layer 25. In case of the fuse 29 having the above-mentioned dimension, the cutting can be made by flowing a current of 500 to 600 mA for 0.5 to 1 second. In case of the third embodiment SD-3, the cutting is achieved without caring about chips which would be inevitably produced in case of the second embodiment SD-2.

Figure 6:
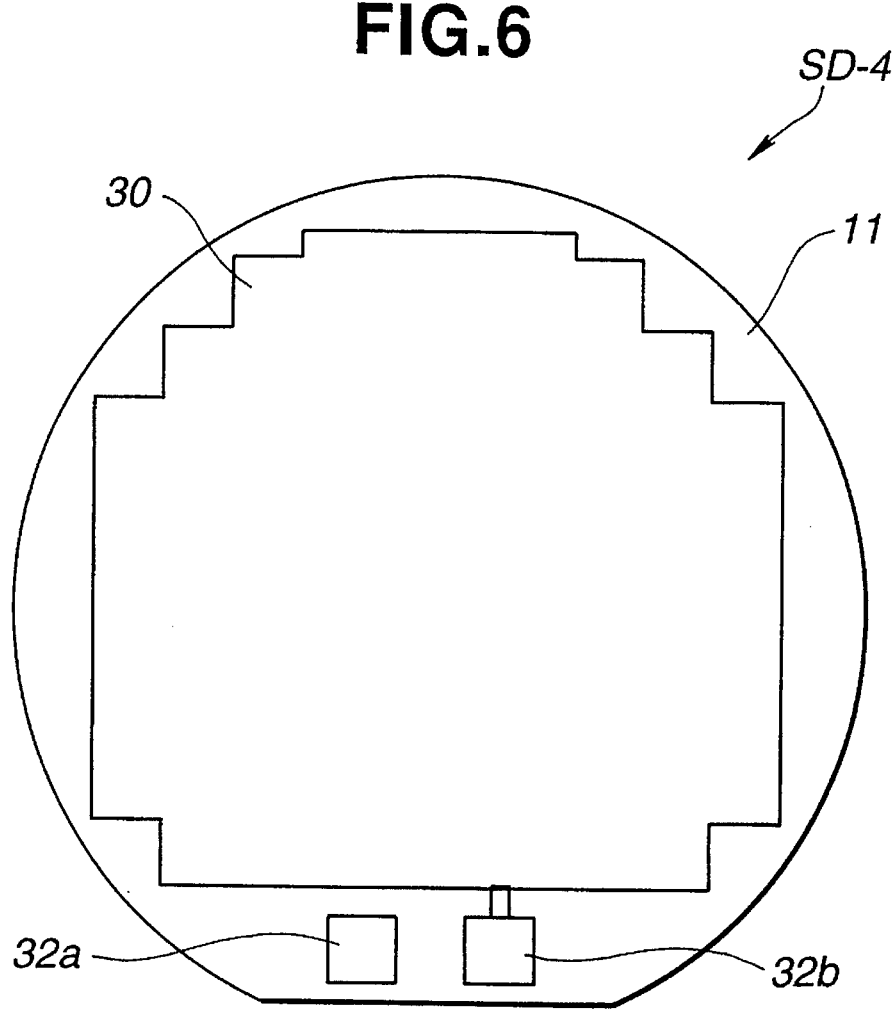
FIG. 6 is a plan view of a semiconductor device which is a fourth embodiment of the present invention.
Figure 7:
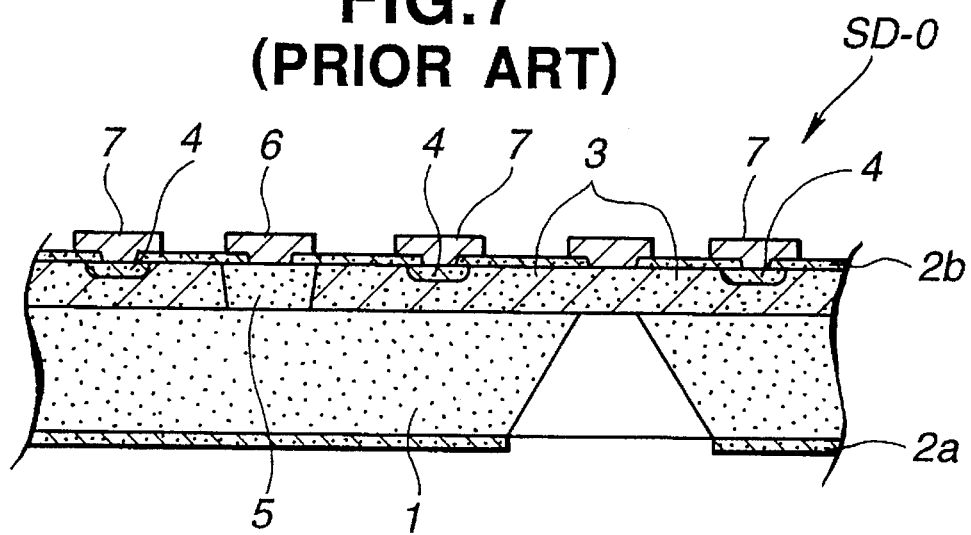
FIG. 7 is a sectional view of an essential portion of a conventional semiconductor device.

Referring to FIG. 6, there is shown a semiconductor device SD-4 which is a fourth embodiment of the present invention.

The device SD-4 is a slight modification of the device SD-3 of the third embodiment. Thus, only different parts will be described in the following.

Denoted by numeral 30 is a zone formed on a major surface of the P-type silicon substrate 11. Within the zone 30, there are arranged the N-type epitaxial regions and the high density P-type isolating regions in such a manner as has been mentioned hereinabove. The N-type epitaxial regions are electrically connected through wiring layers. Although not shown in the drawing, a fuse corresponding to the fuse 29 (see FIG. 5) of the third embodiment is arranged in a corresponding wiring layer. The N-type and P-type regions have respective terminal pads 32b and 32a connected thereto. These terminal pads 32a and 32b are relatively large in size and positioned at a peripheral portion of the circular silicon substrate 11, as shown.

In order to break the fuse 29 (see FIG. 5) upon measurement of the leakage current, a certain voltage (about 1 V) is applied between the two terminal pads 32a and 32b to flow an excessive current in the fuse 29.

What is claimed is:

1. A semiconductor device produced through electrolytic etching process, comprising:

a P-type silicon substrate;

an N-type epitaxial layer formed on said silicon substrate;

first means defining in said N-type epitaxial layer P-type regions;

second means defining in some of said P-type regions N-type regions;

a first wiring layer connecting to predetermined ones of said P-type regions;

a second wiring layer connecting to predetermined ones of said N-type regions;

a given part which has such a possibility that a predetermined magnitude of leakage current flows therethrough between said first and second wiring layers when subjected to the electrolytic etching process; and a circuit electrically connected to one of said first and second wiring layers, said circuit being capable of removing the possibility of the leakage current flow through said given part when opened.

2. A semiconductor device as claimed in claim 1, in which said circuit is electrically connected to said second wiring layer.

3. A semiconductor device as claimed in claim 2, in which said circuit has a portion which can be cut off by a tool having a pointed head.

4. A semiconductor device as claimed in claim 2, further comprising terminal pads respectively connected to said first and second wiring layers.

5. A semiconductor device as claimed in claim 4, in which said circuit includes a fuse which melts down when an excessive current flows therethrough.

6. A semiconductor device as claimed in claim 5, in which said fuse is 1 μm in thickness and 5 μm in width.

7. A semiconductor device as claimed in claim 5, further comprising terminal pads which are electrically connected to said first and second wiring layers, said terminal pads being positioned at a peripheral portion of said P-type silicon substrate which is circular in shape.

8. A semiconductor device as claimed in claim 1, in which said given part exhibits a leakage current flow when connected to an electrically conductive substance.

* * * * *